March 3, 1970

J. J. HENNEN 3,498,401

CONTROL FOR BELT-TYPE AGRICULTURAL
MACHINE PROPULSION DRIVE

Filed May 16, 1968

INVENTOR.
J. J. HENNEN

March 3, 1970   J. J. HENNEN   3,498,401
CONTROL FOR BELT-TYPE AGRICULTURAL
MACHINE PROPULSION DRIVE
Filed May 16, 1968   2 Sheets-Sheet 2

*INVENTOR.*
J. J. HENNEN

United States Patent Office 3,498,401
Patented Mar. 3, 1970

3,498,401
CONTROL FOR BELT-TYPE AGRICULTURAL MACHINE PROPULSION DRIVE
John Joseph Hennen, Ottumwa, Iowa, assignor to Deere & Company, Moline, Ill., a corporation of Delaware
Filed May 16, 1968, Ser. No. 729,739
Int. Cl. B60k 17/00
U.S. Cl. 180—70     5 Claims

ABSTRACT OF THE DISCLOSURE

A self-propelled windrower has a pair of forward drive wheels, driven by separate variable-speed and reversible drives, which in turn are driven by the engine through a variable-speed belt drive, including a variable-diameter sheave having an adjustable section shiftable to vary the drive ratio. The position of the adjustable sheave section is controlled by a lever at the operator's station through a linkage, and a tension spring acts on the linkage to assist the manual adjustment of the linkage.

BACKGROUND OF THE INVENTION

This invention relates to a variable-speed, belt-type, propulsion drive for an agricultural machine, such as a self-propelled windrower or the like, and more particularly to improved control means for manually adjusting and maintaining the ratio in such a belt drive.

A self-propelled windrower conventionally has a pair of forward, laterally spaced drive wheels and is controlled by separately varying the speed and/or direction of rotation of the separate drive wheels. This type of steering control permits trim, pivot, or spin steering of the machine, and therefore provides a wide degree of maneuverability, which is desirable for such machines. Currently, most machines utilize separate, variable-speed belt drives, which include reversing mechanisms, for driving the separate drive wheels. It is also known to drive the separate wheel drives through a single infinitely-variable-speed belt drive having its drive sheave connected to the engine and its driven sheave connected to the separate wheel drives, the ratio in said infinitely-variable drive being variable to vary the ground speed of the machine while the ratios in the separate wheel drives are varied only to steer the machine.

The infinitely-variable belt-type drive conventionally includes a pair of variable-diameter sheaves and the drive ratio is adjusted by shifting one of the sheave sections. It is also known to control the position of the shiftable sheave section by means of a manually-actuated lever at the operator's station on the machine, the lever being connected to the adjustable sheave section by means of suitable linkages. Since the belt tension in such a drive tends to separate the adjustable sheave sections, spring means are conventionally provided to bias the adjustable sheave sections in a direction which opposes the force exerted on the sheave sections by the belt tension. The spring means also assist in the manual adjustment of the drive ratio via the control lever, since manual adjustment of the control lever in a direction which increases the diameter of the adjustable sheave is opposed by the belt tension.

Heretofore, spring means have been utilized which provide a relatively constant spring force on the adjustable sheave section, the force varying only by the difference in deflection of the spring. Thus, at higher drive ratios, wherein the belt tension is higher, the spring does not adequately counterbalance the belt tension, making it difficult to adjust the control lever at higher speeds. Also, in prior machines, the spring force is always acting on the adjustable sheave section in the same direction, so that if it is desired to shift the drive into neutral, wherein the adjustable sheave section is shifted to clear the belt, the movement of the control lever is opposed by the spring, and since there is no belt tension when the belt drive is in the neutral condition to oppose the spring force, it is necessary that the operator overcome the spring force when shifting the control lever into neutral.

SUMMARY OF THE INVENTION

According to the present invention, an improved control system is provided for such an infinitely-variable belt drive, the control system including a spring for counterbalancing the force exerted by the belt tension on the adjustable sheave section. More specifically, a spring-assisted linkage is provided for controlling the adjustable sheave section wherein the spring assistance increases as the drive ratio and consequently the belt tension increase so that the spring substantially counterbalances the belt tension regardless of the ratio in the drive.

Another feature of the invention resides in the provision of means for reversing the force exerted by the spring when the drive is adjusted into a neutral condition, so that the spring maintains the control lever in a neutral position after it is manually placed in its neutral position and also does not oppose the shifting of the drive into neutral.

Other features of the invention reside in its simple and rugged construction and in the fact that the control device is simple and inexpensive to manufacture, adjust, and maintain.

DESCRIPTION OF THE PREFERRED EMBODIMENT

Figure 1:
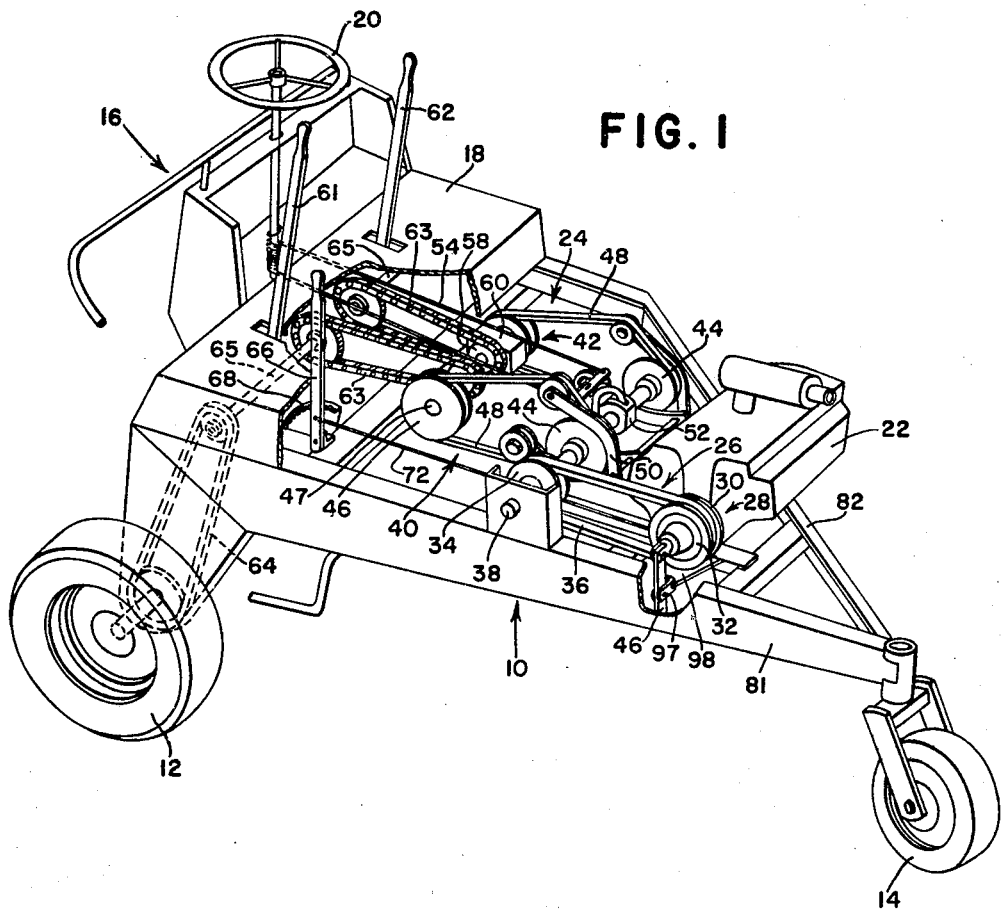
FIG. 1 is a left side top perspective of a windrower traction unit with portions of the operator's station and body removed to show the propulsion drive.
Figure 2:
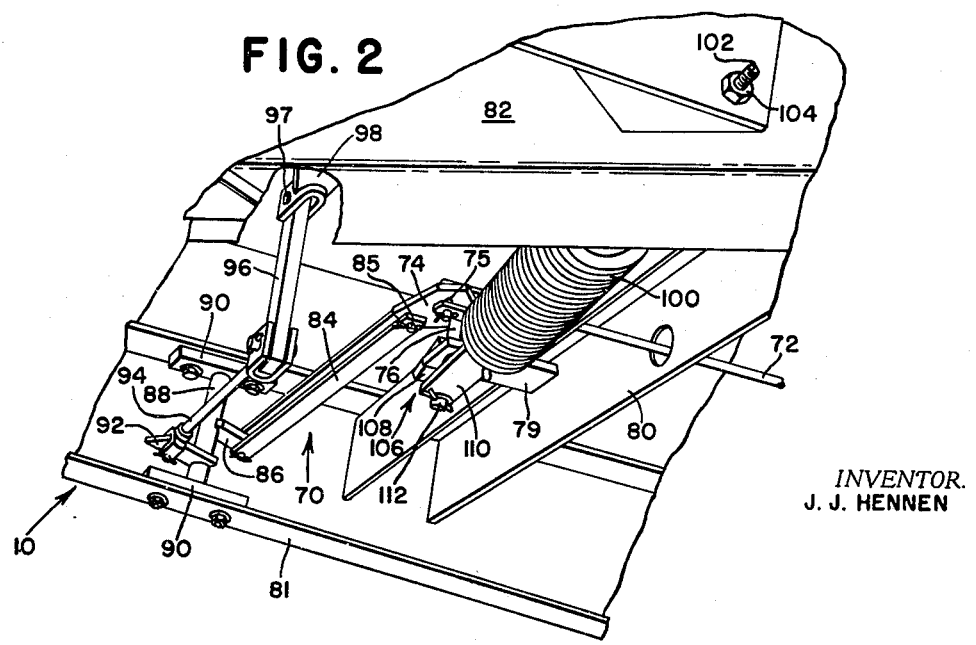
FIG. 2 is a partial perspective view of the underside of the machine looking upwardly and laterally from the right side of the machine and showing the linkage for adjusting the ratio in the traction drive and the spring associated therewith.

The invention is embodied in a self-propelled windrower having a mobile main frame, indicated generally by the numeral 10, mounted on a pair of forward drive wheels 12 and a rearward caster wheel 14, only the left-hand drive wheel being shown in FIG. 1. An operator's station, indicated generally at 16, is disposed on top of a forward portion of the main frame 10 and includes a horizontal floor 18 and a generally upright steering wheel 20, most of the remainder of the operator's station being removed in FIG. 1 to more clearly show the invention.

A conventional internal-combustion engine 22 is mounted on a rearward portion of the frame and drives the harvesting components (not shown) through a belt drive (also not shown) and also drives the drive wheels 12 through a propulsion drive system, indicated entirely by the numeral 24, the propulsion drive system 24 also being utilized to steer the vehicle.

The propulsion drive 24 includes an infinitely-variable belt drive 26 at the output of the engine, the drive 26 including a variable-diameter drive sheave 28 of conventional construction mounted on the output shaft of the engine. The variable-diameter drive sheave conventionally includes a fixed sheave section 30 rigidly connected to the engine shaft and an adjustable sheave section 32, which is axially slidable on the shaft toward and away from the fixed sheave section to vary the effective diameter of the sheave. The infinitely-variable belt drive 26 also includes a variable-diameter driven sheave 34, which is also of conventional construction, and a belt 36 drivingly trained around the sheaves 28 and 34, the driven sheave including a spring biasing its adjustable sheave section toward its fixed sheave section to maintain the proper belt tension. As in many variable-diameter sheaves, the adjustable sheave section 32 of the drive sheave is shiftable to a neutral position wherein it is separated from the fixed sheave section a greater distance than the width of the belt, so that the belt rides on an idler bushing (not shown) and is disengaged from the sheave.

The sheave 34 is mounted on and drives a transverse shaft 38 which serves as the input for a pair of identical drives 40 and 42, which respectively drive the left and right drive wheels 12. Each drive includes a variable-diameter drive sheave 44 mounted on and driven by the shaft 38, a fixed-diameter driven sheave 46 mounted on a shaft 47 forwardly of and parallel to the shaft 38, and a drive belt 48 drivingly trained around the sheaves 44 and 46, an idler mechanism 50 engaging the opposite runs of the belt to maintain the proper belt tension.

The interior sections of the two variable-diameter drive sheaves 44 are interconnected through a laterally shiftable structure 52 disposed between the two drive sheaves 44, so that lateral shifting of the structure 52 increases the diameter of one drive sheave 44 while it decreases the diameter of the other drive sheave 44. Thus, if the ratio in the left wheel drive 40 is increased, the ratio in the right wheel drive 42 will decrease a corresponding amount, whereby one drive wheel is slowed while the opposite drive wheel is speeded up to steer the vehicle. The position of the shiftable structure 52 is controlled by the steering wheel 20 through a steering cable 54, rotation of the steering wheel in opposite directions causing the structure 52 to shift in its opposite direction so that one drive wheel speeds up and the other slows down when the steering wheel is turned.

Each driven sheave 46 drives a chain sprocket 58 through a reverser mechanism 60, the reverser 60 in the left-hand drive being controlled by a left-hand lever 61, while the right-hand reverser is controlled by a right-hand lever 62. The levers 61 and 62 are movable in a fore-and-aft direction and the direction of rotation of the respective wheels which they control correspond to the direction of movement of the respective levers. Thus, for forward operation of the machine, both levers 61 and 62 are moved forwardly, so that both drive wheels are driven in a forward direction. If one lever is moved rearwardly to a neutral condition, wherein the drive through its respective mechanism 60 is disengaged, only the opposite drive wheel will be driven so that the machine will pivot about the stopped drive wheel. If the steering lever is then moved rearwardly, so that its respective drive wheel is driven in a rearward direction, the opposite drive wheels will be driven in opposite directions so that the machine will pivot about a point between the two wheels. Of course, the machine can be driven in reverse by simply pulling both levers 61 and 62 to the rear so that both drive wheels are driven in a reverse direction.

The drive sprockets 58 are connected to the respective drive wheels through chain-type intermediate drives 63, which drive chain-type final drives 64 through transverse shafts 65.

The ratio in the infinitely-variable drive 26 is controlled by the operator by means of a manually actuatable control lever 66 at the operator's station, the lever 66 having its lower end pivotally connected to the frame and being swingable in a fore-and-aft arc about its lower end. A ratchet-type locking device 68 maintains the lever 66 in its selected position, and adjustment of the lever 66 is transmitted to the adjustable sheave section 32 in the drive 26 by means of a linkage, indicated in its entirety by the numeral 70.

The linkage 70 includes an elongated, fore-and-aft extending rod 72 having its forward end connected to the control lever 66 and its rearward end connected to one arm of a horizontal bell crank 74 by means of a vertical pivot 75. The bell crank swings about the vertical axis of an integral pivot or shaft 76 rotatably supported in a pair of vertically spaced brackets 78 and 79 rigidly attached to and extending rearwardly from a channel-shaped transverse frame member 80, which extends between a fore-and-aft frame beam 81 on the left side of the frame and an angled frame beam 82 on the right side of the main frame.

A generally transverse link 84 has one end pivotally connected to the other arm of the bell crank at 85 and its other end connected to a crank arm 86 on an upright rockshaft 88 journaled in a pair of bearing blocks 90 mounted on the left side frame beam 81. A second crank arm 92 is rigidly attached to the rockshaft 88 and is pivotally connected to one end of a generally transverse connecting rod 94, the other end of which is pivotally connected to the lower end of a generally upright lever arm 96, swingable about its center on a fore-and-aft pivot 97 carried by a bracket 98 mounted on the frame. The upper end of the lever arm 96 is pivotally connected to the adjustable sheave section 32, so that as the lever arm 96 rocks about its pivot, it shifts the adjustable sheave section 32 toward and away from the fixed sheave section to vary the diameter of the sheave.

Adjustment of the drive sheave 28 by means of the control lever 66 and the linkage 70 is assisted by a generally transverse, helical-type, tension spring 100 having one end adjustably connected to the right-hand frame beam 82 by means of an eyebolt 102 extending through the beam and adjustably secured thereto by means of a nut 104. The other end of the spring is connected to the linkage 70 by means of an over-center mechanism, indicated generally by the numeral 106. The mechanism 106 is formed by a crank arm 108 rigidly attached to the bell crank pivot shaft 76 at one end, and having its opposite end connected to a link 110 by means of a vertical pivot 112, the link 110 being connected to the end of the spring 100.

Figure 3:
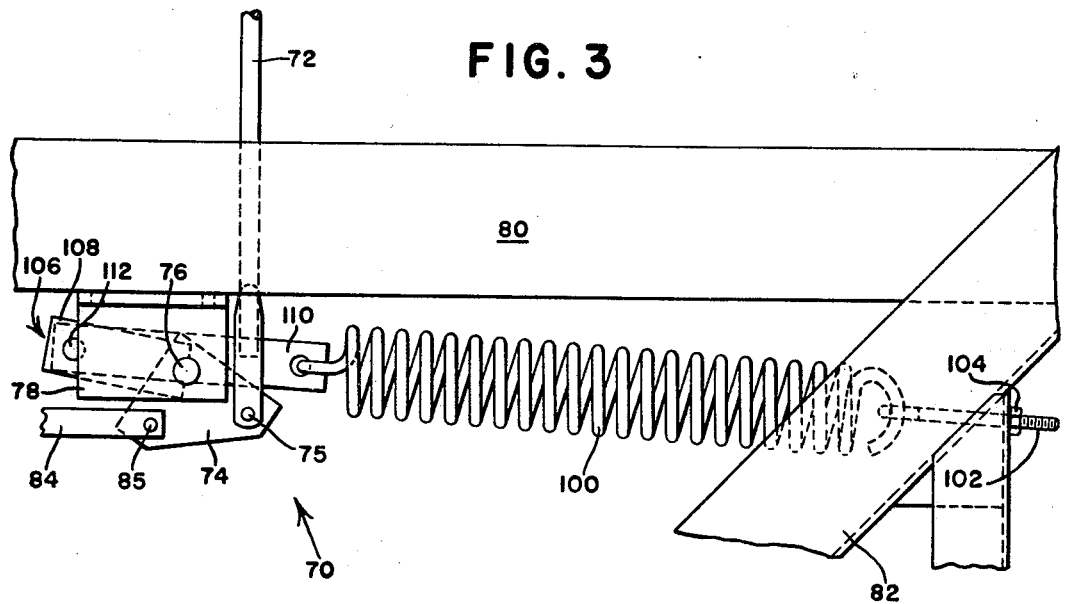
FIG. 3 is a plan view of the spring and a portion of the linkage shown in FIG. 2, showing the linkage in neutral condition.

In operation, the spring 100 is adjusted for the desired amount of pre-tension by adjusting the nut 104 on the eyebolt 102. When the control lever 66 is moved to its rearwardmost or neutral position, as shown in FIG. 3, the bell crank 74 is rotated in a clockwise direction, shifting the link 84 outwardly (to the left in FIG. 3), and consequently shifting the connecting rod 94 and the lower end of the lever arm 96 inwardly. This, of course, shifts the upper end of the lever arm 96 and the adjustable sheave section 32 connected thereto outwardly. Thus, when the control lever is in its neutral position, the adjustable sheave section is in its outermost position, wherein it is spaced a greater distance from the fixed sheave section 30 than the width of the belt, which rides on the idler bushing.

When the linkage 70 is in its neutral condition, it is biased toward this condition by the spring 100, since the over-center mechanism 106 has gone slightly over-center. As is apparent from FIG. 3, the line of force exerted by the spring 100 on the link 110 is forwardly of the axis of rotation of the bell crank 74, so that the spring exerts a force on the bell crank through the mechanism 106 which biases the bell crank 74 in a clockwise direction and therefore biases the linkage 70 and the control lever 66 and adjustable sheave section 32 toward a neutral condition.

If the control lever is moved slightly forwardly against the bias of the spring 100, the line of force exerted by the spring on the bell crank will extend through the axis of the bell crank pivot shaft 76, so that at this point the mechanism 106 is centered and the spring 100 exerts no force on the linkage 70.

As the rod 72 is moved forwardly to increase the ground speed of the machine, the bell crank 74 and its pivot shaft 76 rotate in a counterclockwise direction, the counterclockwise movement of the bell crank shifting the adjustable sheave section 32 toward the fixed sheave section to squeeze the belt 36 and increase the diameter of the adjustable drive sheave 28, which, of course, increases the speed of the belt 36 and the ground speed of the machine. As the bell crank 74 rotates in said counterclockwise direction, the arm 108, which is rigidly attached to the pivot shaft 76, also rotates, thereby increasing the distance between the axis of the pivot shaft 76 and the line of force exerted by the spring 100. Thus, while the force exerted by the spring remains relatively constant, decreasing slightly as the bell crank rotates in the counterclockwise direction, the moment arm through which the spring acts on the linkage increases substantially, so that the biasing force exerted by the spring on the linkage increases as the drive ratio increases.

Figure 4:
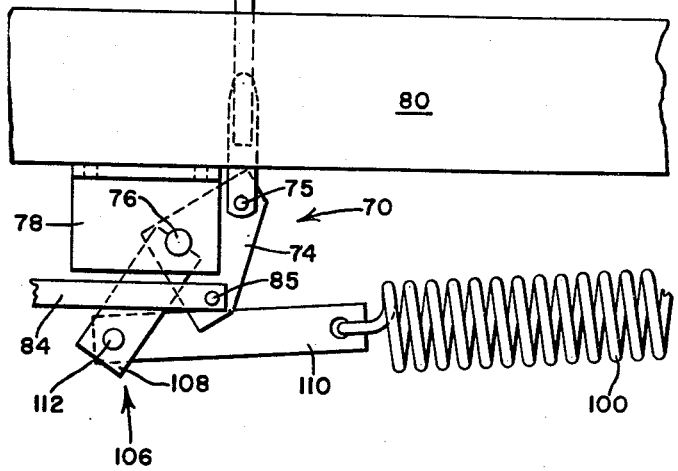
FIG. 4 is a partial view similar to FIG. 3, but showing the linkage adjusted for a maximum speed condition of the traction drive.

Thus, when the control lever is in its forwardmost position for maximum output speed of the drive 26, as shown in FIG. 4, the moment arm through which the spring acts on the linkage is at its maximum, providing the maximum spring assistance at maximum ratio in the drive 26 when the belt loads are greatest. As is apparent, the increased spring assistance permits easy adjustment of the ratio in the drive 26 via the control lever regardless of the belt loads or speed ratio.

I claim:

1. In a self-propelled agricultural machine having a mobile main frame mounted on a pair of drive wheels, an operator's station, a power source, and a propulsion drive means connecting the power source to the drive wheels and including a variable-speed belt drive having a variable-diameter sheave with an adjustable section shiftable into different positions to vary the ratio in the belt drive, the improvement comprising: a variable-speed control lever disposed at the operator's station and shiftable between neutral and maximum speed positions; a linkage means operative between the variable-speed control lever and the variable-diameter sheave to shift the adjustable sheave section into different positions corresponding to the different positions of the control lever; a spring means; and means connecting the spring means to the linkage means for transmitting a spring force to the linkage means and including an over-center mechanism operative between the spring means and the linkage means and shiftable between a first position wherein its transmits a spring force to the linkage means biasing the shiftable sheave section toward the opposite sheave section, and to an over-center position wherein it transmits a spring force to the linkage means biasing the shiftable sheave section away from the opposite sheave section, the linkage means operatively connecting the variable-speed control lever to the over-center mechanism to respectively shift the over-center mechanism into its first and over-center positions in response to movement of the control lever into its maximum speed and neutral positions.

2. The invention defined in claim 1 wherein the over-center mechanism is shiftable into a centered position when the control lever is shifted into a predetermined position between its maximum speed and neutral positions, said predetermined position being closely adjacent to the neutral position.

3. The invention defined in claim 2 wherein the over-center mechanism includes a lever arm swingable about an axis adjacent one end and having its other end connected to the spring means, the line of force exerted by the spring means acting on the lever arm extending through said pivot axis when the mechanism is in its centered position and being spaced increasing distances from the pivot axis as the control lever moves increasing distances from said predetermined position.

4. The invention defined in claim 3 and including adjusting means operatively associated with the spring means for varying the force exerted by the spring means for a given position of the control lever.

5. In a self-propelled agricultural machine having a mobile main frame mounted on a pair of drive wheels, an operator's station, a power source, and a propulsion drive means connecting the power source to the drive wheels and including a variable-speed drive having a variable-diameter sheave with an adjustable section shiftable into different positions to vary the ratio in the belt drive, the improvement comprising: a variable-speed control lever disposed at the operator's station and shiftable between neutral and maximum speed positions; linkage means operative between the variable-speed control lever and the variable-diameter sheave to shift the adjustable sheave section into different positions corresponding to the different positions of the control lever; a spring means; and connecting means operatively connecting the spring means to the linkage means so that the spring means exerts an increasing force on the linkage means as the control lever moves from a predetermined position toward its maximum speed position, the linkage means transmitting said spring force to the shiftable sheave section to bias it toward the opposite section.

References Cited

UNITED STATES PATENTS 2,491,248  12/1949  Carroll.
3,283,485  11/1966  Koch et al. _____ 180—6.2 X LEO FRIAGLIA, Primary Examiner J. A. PEKAR, Assistant Examiner U.S. Cl. X.R.
74—230.17